(No Model.) 2 Sheets—Sheet 1.

V. E. KEEGAN.
ELECTRIC MOTOR.

No. 338,977. Patented Mar. 30, 1886.

Attest:
Waller Donaldson
F. L. Middleton

Inventor
Vincent E. Keegan
by Joyce & Spear
Attys.

N. PETERS, Photo-Lithographer, Washington, D. C.

(No Model.) 2 Sheets—Sheet 2.

V. E. KEEGAN.
ELECTRIC MOTOR.

No. 338,977. Patented Mar. 30, 1886.

Attest:
Hallern Donaldson
F. L. Middleton

Inventor
Vincent E. Keegan
by Joyce & Spear
Attys

UNITED STATES PATENT OFFICE.

VINCENT E. KEEGAN, OF BOSTON, MASSACHUSETTS.

ELECTRIC MOTOR.

SPECIFICATION forming part of Letters Patent No. 338,977, dated March 30, 1886.

Application filed October 31, 1885. Serial No. 181,516. (No model.)

*To all whom it may concern:*

Be it known that I, VINCENT ELIJA KEEGAN, of Boston, in the county of Suffolk and State of Massachusetts, have invented a new and useful Improvement in Electro-Magnetic Motors; and I do hereby declare that the following is a full, clear, and exact description of the same.

My invention relates, mainly, to electric motors, but parts are applicable as well to dynamo-electric machines.

The invention includes a new construction in the cores and a new construction in the poles, the latter being an improvement also upon the form of poles for electric motors and dynamo-machines shown in Letters Patent granted me on the 10th day of April, 1883, and numbered 275,392. It also includes an improved construction of commutator.

The object of that part of my invention first stated is to greatly diminish or prevent the induced currents in the cores, and to facilitate the demagnetization of the cores.

Of the second part of the invention, as stated above, the object is to simplify the construction of the poles, and, by a modified form of the faces thereof, to cause them, when used in electric motors, to act with greater leverage and force under the combined influence of the attraction and repulsion.

The third part of the invention is designed to avoid sparks and waste of current in the ordinary forms of commutator.

Figure 1:
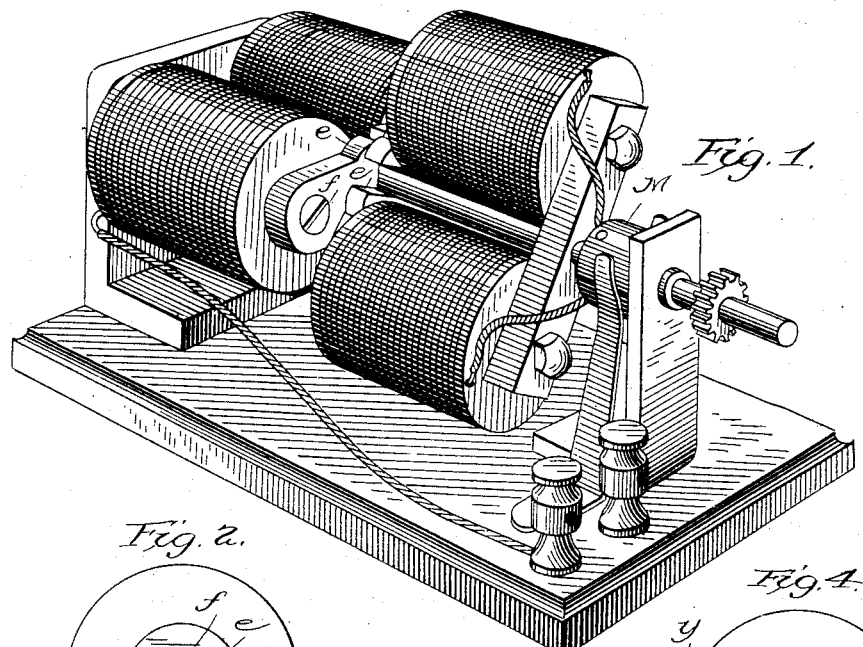
Figure 2:
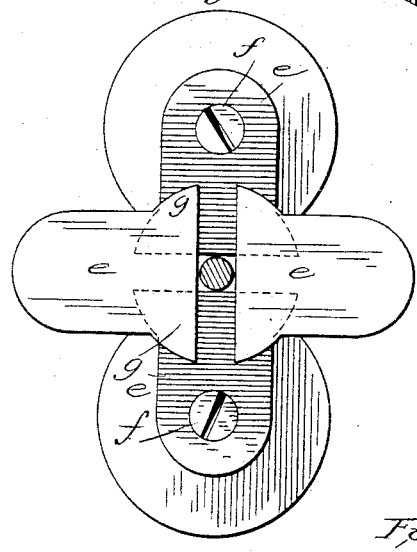
Figure 4:
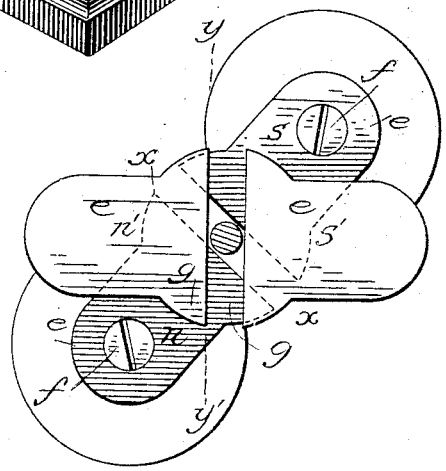
Figure 3:
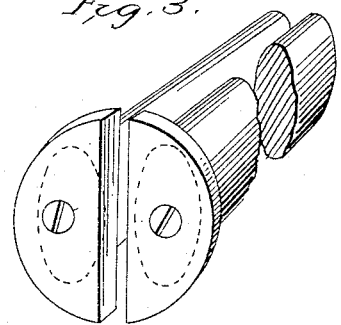
Figure 13:
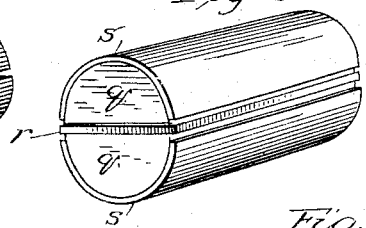
Figure 12:
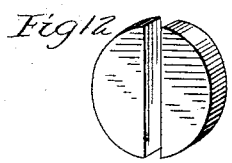
Figure 14:

In the accompanying drawings, Figure 1 represents a perspective view of the magnets adapted either to an electric motor or a dynamo-machine. Figs. 2 and 4 show face views of the poles, and illustrate the movement and magnetic change of the poles of the electric motor. Fig. 3 represents a modified form of poles adapted to large machines, and therewith a modified form of core. Figs. 5, 6, 7, and 8 represent modifications of my improved core, and Figs. 9, 10, 11, and 12 show modifications of my improved poles, made on the same principles as the core, and adapted thereto. Figs. 13 and 14 show my improved commutator in perspective and end view.

Figure 5:
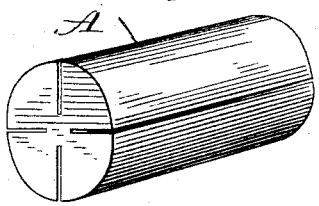

In Fig. 5 is shown a cylindrical core, A. Its surface is cut by longitudinal slits in planes radial to the axis, which may be, but not necessarily, at equal distances from each other, dividing the surface into two or four equal parts. The slits are sunk to near the center, but leave metal at the center sufficient for strength. The core is wound over its surface in the usual manner. I have found by practical experiment that this construction serves to destroy to a very large extent the induced current in the core of an electric motor. The poles are screwed to each of the four sections of the core, and demagnetization takes place more readily from the divided than from the solid core.

Figure 6:
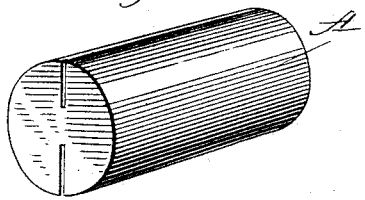
Figure 7:
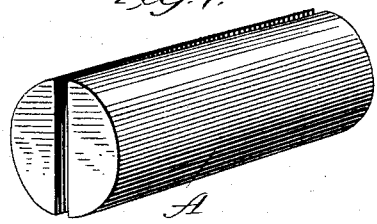
Figure 8:
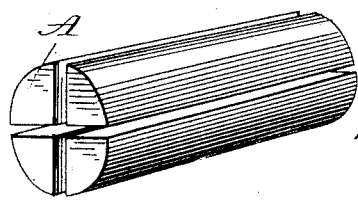

Instead of cutting four slits in the core, I may make it in the form shown in Fig. 6, with two slits extended in the same way, and dividing the core into two parts. The core thus slitted, and with a solid center, acts as a solid single core, and the improved result is only in reference to the correction of the induced currents. The slits have been extended quite through, as shown in Figs. 7 and 8; but in this construction the induced current is not interrupted in the same way, but separate induced currents will occur in each section, which will tend to counteract and neutralize each other, for the reason that the currents on opposite faces of the fixed parts move in opposite directions, and set up secondary magnetic effects.

The part of my invention relating to the poles of the magnets is shown in Figs. 1 and 2 and in figures of detached parts 9, 10, 11, and 12. In these the poles are placed at right angles to the axis, and are simple plain pieces fixed with their sides against the cores, and their ends or polar faces facing each other. This enables me to use the same form for both the stationary and the moving magnet, and this form is also cheaper to manufacture than either of the poles shown in my aforesaid patent. These poles are shown at $e$ in Figs. 1 and 2. A screw, $f$, at the outer end, fixes the pole to the core. The inner or polar extensions are enlarged, as shown at $g$, to give increased leverage. As the poles of the moving magnets move in a plane parallel with the sides of those of the stationary magnet, the enlargements at the ends may be made to any desired extent without complication or difficulty of construction which would interfere with the application of the feature to the forms of poles shown in my said patent. These extensions are designed especially for an electric motor, and the extension g places the metal at a greater distance from the axis line of the moving magnet, and thus the leverage is increased. The extensions may be carried as far as practicable, regard always being had to the size of the machine.

In respect to the location of the poles of each magnet in relation to each other, the same general principle is observed as that set forth in my patent aforesaid. The faces of the polar extensions lie near each other, so that the face of the moving magnet in passing from one pole to the other of the stationary magnet overlaps, as set forth in said patent. In its application to an electric motor I obtain this valuable effect, which is that the moving pole, as it passes from one pole to the other of the stationary magnets, is acted on by the double force of repulsion of the like pole of the fixed magnet from which it is receding, while it is attracted by the opposite polarity of the pole which it approaches.

The movement of the poles and direction of the lines of attraction and repulsion are shown in Figs. 1 and 2. In these figures the stationary magnet is shown in full and the moving magnet partially in dotted lines. From the position of one-half revolution—that is to say, where the face of the moving pole is parallel to the line $y\ y'$, representing the face of the stationary pole, and where the magnet-armature changes polarity—the attraction is from $n$ to $s'$. As soon as the point $x$ has passed the point $y$ the poles $n\ n'$ repel each other, and to the attractive force of pole $s$ upon the pole $n$ is added the repelling force of pole $n'$. This continues until the faces of the stationary and moving magnets are again parallel by a half-revolution, when the commutator M changes the polarity of the moving magnets, and the motion is continuous in the same direction.

Figure 9:
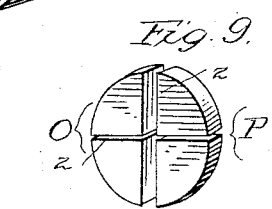
Figure 11:
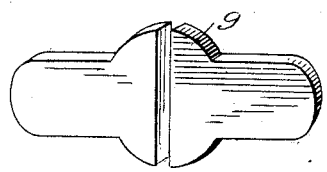
Figure 10:
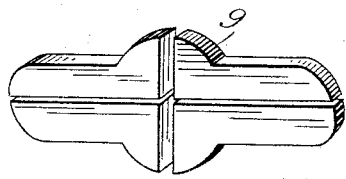

In Figs. 9 and 10 I have shown the method of division of the cores applied to the poles. The poles O and P, which are in form applicable to the cores, Figs. 5 to 8, inclusive, are divided by lines $z\ z$, and the parts may be separated by interposed paper or other suitable material, as described, for the cores. Fig. 10 shows the other form of pole divided in the same manner. The effect is the same as that described for the divided poles.

In the improved commutator shown in Fig. 13 the body of the spool is composed of two nearly semi-cylindrical blocks of wood, $q\ q$, or other non-conducting material. Between these is interposed a conducting-plate, $r$. Over the surfaces I place metallic plates $s\ s$, curved to fit the surfaces and to form contact-surfaces for the brushes.

The edges of the plate $r$ are separated electrically from the edges of the curved plates, and are flush with these contact-surfaces, so that the brush leaving the contact-surface of one of the plates touches the edge of the dividing-plate and before it reaches the other curved plate.

The interposed plate may be from a sixteenth to one-fourth of an inch in thickness, according to the diameter of the commutator. This plate forms electrical connections between the brushes as they pass from one section of the commutator to the other in changing polarity, and this conducts the current directly to the other pole of the battery, thus avoiding in great measure the sparking and effecting a saving and avoiding extra currents.

Instead of the plate interposed between two nearly semicircular blocks, I may place a brass or other strip between the edges of the contact-plates $s\ s$ on each side and connect them by a cross-bar, $t$, the strips being insulated from the contact-plate in the same manner as the edges of the plate $r$.

The essential feature is a conductor through or across the commutator between the contact surfaces or sections, whereby the brushes are connected with each other when passing from one to the other of the contact surfaces or sections. Manifestly the same principle may be applied to a commutator of any number of sections.

I claim as my invention—

1. In an electric motor or dynamo-electric machine, a cylindrical core having longitudinal slots and a central connecting part, combined with coils wound circumferentially around the core, all substantially as described.

2. In an electric motor or dynamo-machine, and in combination with stationary and moving magnets, one arranged to revolve in front of the other, the plain polar pieces all of the same shape and size, as described, fixed to the ends of the cores of the magnets and extending inwardly, these polar pieces being arranged near each other and with their faces in parallel planes, as shown.

3. In an electric motor or dynamo-machine, the plain polar pieces having lateral extensions $g$, as described, fixed to the ends of the cores of the stationary magnet and extending inwardly, in combination with like polar pieces fixed to the ends of the cores of the moving magnet, these polar pieces being arranged near each other with their faces in parallel planes, as shown.

In testimony whereof I have signed my name to this specification in the presence of two subscribing witnesses.

VINCENT E. KEEGAN.

Witnesses:
J. B. THOMPSON,
F. L. MIDDLETON.